US009088397B2

(12) United States Patent
Tiirola et al.

(10) Patent No.: US 9,088,397 B2
(45) Date of Patent: Jul. 21, 2015

(54) CARRIER TYPE FOR TIME DIVISION COMMUNICATION

(71) Applicant: NOKIA SEIMENS NETWORKS OY, Espoo (FI)

(72) Inventors: Esa Tapani Tiirola, Kempele (FI); Timo Erkki Lunttila, Espoo (FI); Kari Juhani Hooli, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 111 days.

(21) Appl. No.: 13/890,883

(22) Filed: May 9, 2013

(65) Prior Publication Data

US 2014/0334457 A1     Nov. 13, 2014

(51) Int. Cl.
| | |
|---|---|
| *H04J 3/06* | (2006.01) |
| *H04L 5/00* | (2006.01) |
| *H04L 5/14* | (2006.01) |
| *H04W 72/04* | (2009.01) |

(52) U.S. Cl.
CPC .............. *H04L 5/0053* (2013.01); *H04J 3/06* (2013.01); *H04L 5/0092* (2013.01); *H04L 5/0096* (2013.01); *H04L 5/1469* (2013.01); *H04W 72/0446* (2013.01); *H04L 5/0023* (2013.01)

(58) Field of Classification Search
USPC .................. 370/241–279, 312–329, 331–336
See application file for complete search history.

(56) References Cited

U.S. PATENT DOCUMENTS

| | | | | |
|---|---|---|---|---|
| 8,804,586 | B2 * | 8/2014 | Fong et al. ..................... | 370/311 |
| 2013/0114525 | A1 * | 5/2013 | Ahmadi ........................ | 370/329 |
| 2013/0114565 | A1 * | 5/2013 | Chen et al. .................... | 370/330 |
| 2013/0163538 | A1 * | 6/2013 | Kuo ............................... | 370/329 |
| 2013/0242751 | A1 * | 9/2013 | Li .................................. | 370/241 |
| 2013/0272215 | A1 * | 10/2013 | Khoryaev et al. ............. | 370/329 |
| 2013/0301491 | A1 * | 11/2013 | Bashar et al. ................. | 370/280 |
| 2013/0301570 | A1 * | 11/2013 | Xu et al. ........................ | 370/329 |
| 2013/0336193 | A1 * | 12/2013 | Luo et al. ...................... | 370/312 |
| 2013/0343300 | A1 * | 12/2013 | Kim et al. ..................... | 370/329 |

OTHER PUBLICATIONS

Ericsson, RP-122028, "Updated WI proposal: New Carrier Type for LTE", 3GPP TSG-RAN Meeting #58, Barcelona, Spain, Dec. 4-7, 2012, 14 pages.

(Continued)

*Primary Examiner* — Man Phan
(74) *Attorney, Agent, or Firm* — Squire Patton Boggs (US) LLP

(57) ABSTRACT

Certain embodiments relate to wireless communication systems, such as long term evolution advanced (LTE-A), which may be part of third generation partnership project (3GPP) LTE release 12 (Rel-12). More specifically, certain embodiments may provide an arrangement related to new carrier type for time division long term evolution (TD-LTE), which may also be related to Enhanced Interference Management and Traffic Adaptation. According to certain embodiments, a method can include determining that a split configuration is to be followed, in which at least one system information block configured uplink subframe is reconfigured as a new carrier type downlink subframe, whereas at least one other system information block configured subframe is as indicated by system information block configuration. The method can also include applying the determined split configuration to communications with an access point.

22 Claims, 8 Drawing Sheets

(56) References Cited

OTHER PUBLICATIONS

Catt, RP-121772, "New work item proposal for Further Enhancements to LTE TDD for DL-UL Interference Management and Traffic Adaptation", 3GPP TSG-RAN Meeting #58, Barcelona, Spain, Dec. 4-7, 2012, 15 pages.
International Search Report dated Jul. 23, 2014, issued in corresponding PCT/EP2014/058590, 13 pages.
Renesas Mobile Europe Ltd: "Discussion on Enhancements for Dynamic TDD UL-DL Configuration"; 3GPP Draft;. R1-122363; 3rd Generation Partnership Project (3GPP); Mobile Competence Centre; 650, Route des Lucioles; F-06921 Sophia-Antipolis Cedex; France; vol. RAN WG1, no. Prague, Czech Republic; 20120521-20120525; May 12, 2012; XP050600626, [retrieved on May 12, 2012], Section 2.
Texas Instruments: "Location of PSS/SSS on the New Carrier Type"; 3GPP Draft; R1-130696; 3rd Generation Partnership Project (3GPP); Mobile Competence Centre; 650, Route des Lucioles; F-06921 Sophia-Antipolis Cedex; France; vol. RAN WG1, no. St. Julian, 20130128-20130201; Jan. 29, 2013, XP050663946, Retrieved from the Internet: URL:http://www.3gpp.org/ftp/sg_ran/WG1_RL1/TSGR1_72/Docs/ [retrieved on Jan. 29, 2013] the whole document.
Sharp: "Backward compatibility for eIMTA"; 3GPP Draft; R1-130533; 3rd Generation Partnership Project (3GPP); Mobile Competence Centre; 650, Route des Lucioles; F-06921 Sophia-Antipolis Cedex; France; vol. RAN WG1, no. St. Julian; 20130128-20130201; Jan. 19, 2013, XP050663799, retrieved from the Internet: URL:http://www.3gpp.org/ftp/tsg_ran/WG1_RL1/TSGR1_72/Docs/ [retrieved on Jan. 19, 2013], section 2.
Samsung: "Discussion on necessity and performance of new DMRS in NCT"; 3GPP Draft; R1-131001; 3rd Generation Partnership Project (3GPP); Mobile Competence Centre; 650, Route des Lucioles; F-06921 Sophia-Antipolis Cedex; France; vol. RAN WG1, no. Chicago; 20130415-20130419; Apr. 6, 2013, XP050696990, Retrieved from the Internet: URL:http://www.3gpp.org/ftp/tsg_ran/WG1_RL1/TSGR1_72b/Docs/ [retrieved on Apr. 6, 2013] Sections 2, 4, Appendix.
Ericsson: "On New Carrier Type"; 3GPP Draft; R1-130546; 3rd Generation Partnership Project (3GPP); Mobile Competence Centre; 650, Route des Lucioles; F-06921 Sophia-Antipolis Cedex; France; vol. RAN WG1, no. St. Julian, 20130128-20130201, Jan. 19, 2013, XP050663809, Retrieved from the Internet: URL:http://www.3gpp.org/ftp/tsg_ran/WG1_RL1/TSGR1_72/Docs/ [retrieved on Jan. 19, 2013] the whole document.

* cited by examiner

| Subframe # | 0 | 1 | 2 | 3 | 4 | 5 | 6 | 7 | 8 | 9 |
|---|---|---|---|---|---|---|---|---|---|---|
| | CRS + PSS/SSS | | | | | CRS + PSS/SSS | | | | |

Figure 1
PRIOR ART

| UL/DL configuration | Switching-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

Figure 2
PRIOR ART

| | 0 | 1 | 2 | 3 | 4 | 5 | 6 | 7 | 8 | 9 |
|---|---|---|---|---|---|---|---|---|---|---|
| SIB-1 | D | S | U | U | U | D | S | U | U | U |
| Flex | D | S | U | F | F | D | F | F | F | F |

Figure 3
PRIOR ART

| Subframe # | 0 | 1 | 2 | 3 | 4 | 5 | 6 | 7 | 8 | 9 |
|---|---|---|---|---|---|---|---|---|---|---|
| Legacy Ues | D | S | U | U | U | D | S | U | U | U |
| Rel-12 Ues | D | S | U | NCT-D / U | NCT-D / U | D | S | NCT-D / U | NCT-D / U | NCT-D / U |

Legacy subframes

NCT subframes

Figure 4

|   | 0 | 1 | 2 | 3 | 4 | 5 | 6 | 7 | 8 | 9 |
|---|---|---|---|---|---|---|---|---|---|---|
| Legacy mode | D | S | U | U | U | D | S | U | U | U |
| flexible TDD mode (eIMTA) | D | S | U | F | F | D | F | F | F | F |
| | | | | | | | | | | |
| NCT DL Mode, option#1 | D | S | U | N | N | D | S | N | N | N |
| NCT DL Mode, option#2 | D | S | U | N | N | D | D | N | N | N |
| NCT DL Mode, option#3 | D | S | U | U | N | D | D | N | N | N |
| NCT DL Mode, option#4 | D | S | U | F | N | D | D | N | N | N |

Figure 5

CARRIER TYPE FOR TIME DIVISION COMMUNICATION

BACKGROUND

1. Field

Certain embodiments relate to wireless communication systems, such as long term evolution advanced (LTE-A), which may be part of third generation partnership project (3GPP) LTE release 12 (Rel-12). More specifically, certain embodiments may provide an arrangement related to new carrier type for time division long term evolution (TD-LTE), which may also be related to Enhanced Interference Management and Traffic Adaptation.

2. Description of the Related Art

New carrier type (NCT) aims to provide improved energy efficiency, improved support for heterogeneous network (HetNet) and enhanced spectral efficiency. NCT operation can be based on demodulation reference signal (DM RS) and enhanced physical downlink control channel (EPDCCH), instead of common reference signal (CRS) and physical downlink control channel (PDCCH).

FIG. 1 shows a typical radio frame structure of new carrier type. As shown in FIG. 1, CRS, along with primary synchronization signal (PSS)/secondary synchronization signal (SSS), are transmitted only in every 5th subframe from one antenna port for the purpose of time/frequency tracking and synchronization as well as radio resource management (RRM) measurements. Spectral efficiency can be improved by minimizing legacy control signaling, such as PDCCH, PHICH, PCFICH, PBCH, and CRS. However, conventionally NCT is not backwards compatible, which means that legacy user equipment (UEs), such as those from Rel-8 to Rel-11, may not be able to operate in the NCT carrier at all.

Enhanced interference management and traffic adaptation (eIMTA) aims to enable more flexible time division duplex (TDD) uplink-downlink (UL-DL) reconfiguration for traffic adaptation in, for example, small cells. The eNodeB may vary UL-DL configuration relatively often, for those UEs configured to flexible UL/DL mode, compared to an existing situation where UL-DL configuration is in practice very stationary.

In eIMTA, there may be a predefined cell-specific UL/DL configuration broadcasted in the cell using system information block #1 (SIB-1). The legacy UEs (Rel-8 to Rel-11) in the cell may follow this configuration all the time. No new TDD UL-DL configurations are introduced. Rather, flexible TDD reconfiguration can only happen among existing (seven) configurations. FIG. 2 illustrates the available UL-DL configurations for TD-LTE (Rel-8/9/10/11).

Moreover, in eIMTA, TDD reconfiguration typically can occur with, at most, a single radio frame periodicity for those UEs configured to flexible UL/DL mode, although certain signaling solutions allow for selecting link direction separately for each scheduled subframe. The radio frame may be about 10 ms and consists of 10 subframes. In each UL-DL configuration there may be fixed subframes where the link direction is always predetermined. These fixed subframes are denoted as D (Downlink), S (Special) and U (Uplink) in FIG. 2. Additionally, as shown in FIG. 3, there may also be flexible subframes (denoted as F). Flexible (F) subframes can be used as D or U. The number of Flexible subframes may depend on the scenario, for example by SIB-1 configuration.

FIG. 3 illustrates a radio frame showing Downlink (D), Uplink (U) and Special (S) subframes according to exemplary SIB-1 configuration #0, as well as an exemplary set of flexible subframes available for Rel-12 UEs configured to flexible UL/DL mode.

Thus, FIG. 3 illustrates the basic settings. TDD configuration 0 is shown as an example, but the same principle can apply to other configurations as well. In addition to the SIB-1 configured UL-DL configuration, which defines whether a given subframe in the radio frame is downlink, special, or uplink subframe, in the case of flexible TDD UL-DL configurations some of the, for example, uplink subframes can be changed into downlink subframes.

Existing explanations of NCT, however, are limited to frequency division duplex (FDD) mode, rather than providing TDD specific aspects of NCT apart from some details on the reference signal and synchronization signal structure. Therefore, backwards compatibility related to NCT has not been addressed separately for FDD and TDD. Moreover, the combination of NCT and eIMTA is not conventionally known.

SUMMARY

According to certain embodiments, a method can include determining that a split configuration is to be followed, in which at least one system information block configured uplink subframe is reconfigured as a new carrier type downlink subframe, whereas at least one other system information block configured subframe is as indicated by system information block configuration. The method can also include applying the determined split configuration to communications with an access point.

In certain embodiments, a method can include configuring a user device to follow a split configuration, in which at least one system information block configured uplink subframe is reconfigured as a new carrier type downlink subframe, whereas at least one other system information block configured subframe is as indicated by system information block configuration. The method can also include signaling the user device the configuration.

An apparatus, according to certain embodiments, can include at least one processor and at least one memory including computer program code. The at least one memory and the computer program code can be configured to, with the at least one processor, cause the apparatus at least to determine that a split configuration is to be followed, in which at least one system information block configured uplink subframe is reconfigured as a new carrier type downlink subframe, whereas at least one other system information block configured subframe is as indicated by system information block configuration. The at least one memory and the computer program code can also be configured to, with the at least one processor, cause the apparatus at least to apply the determined split configuration to communications with an access point.

An apparatus, in certain embodiments, can include at least one processor and at least one memory including computer program code. The at least one memory and the computer program code can be configured to, with the at least one processor, cause the apparatus at least to configure a user device to follow a split configuration, in which at least one system information block configured uplink subframe is reconfigured as a new carrier type downlink subframe, whereas at least one other system information block configured subframe is as indicated by system information block configuration. The at least one memory and the computer program code can also be configured to, with the at least one processor, cause the apparatus at least to signal the user device the configuration.

According to certain embodiments, an apparatus can include means (for example, 824 and 825 in FIG. 8) for determining that a split configuration is to be followed, in which at least one system information block configured uplink subframe is reconfigured as a new carrier type downlink subframe, whereas at least one other system information block configured subframe is as indicated by system information block configuration. The apparatus can also include means for applying (for example, 824 and 826 in FIG. 8)*the* determined split configuration to communications with an access point.

In certain embodiments, an apparatus can include means (for example, 814 and 815 in FIG. 8) for configuring a user device to follow a split configuration, in which at least one system information block configured uplink subframe is reconfigured as a new carrier type downlink subframe, whereas at least one other system information block configured subframe is as indicated by system information block configuration. The apparatus can also include means for signaling (for example, 816 in FIG. 8) the user device the configuration.

A computer-readable medium, for example a signal or a non-transitory computer-readable medium, can, according to certain embodiments, be encoded with instructions that, when executed in hardware, perform a process. The process can include determining that a split configuration is to be followed, in which at least one system information block configured uplink subframe is reconfigured as a new carrier type downlink subframe, whereas at least one other system information block configured subframe is as indicated by system information block configuration. The process can also include applying the determined split configuration to communications with an access point.

A computer-readable medium, for example a signal or a non-transitory computer-readable medium, can, in certain embodiments, be encoded with instructions that, when executed in hardware, perform a process. The process can include configuring a user device to follow a split configuration, in which at least one system information block configured uplink subframe is reconfigured as a new carrier type downlink subframe, whereas at least one other system information block configured subframe is as indicated by system information block configuration. The process can also include signaling the user device the configuration. The process can further include transmitting to the user equipment following the split configuration based on the determining.

BRIEF DESCRIPTION OF THE DRAWINGS

For proper understanding of the invention, reference should be made to the accompanying drawings, wherein:

FIG. 1 shows a typical frame structure of new carrier type.

FIG. 2 illustrates UL-DL configurations for TD-LTE (Rel-8/9/10/11).

FIG. 3 illustrates a radio frame showing Downlink (D), Uplink (U) and Special (S) subframes according to exemplary SIB-1 configuration #0, as well as flexible (F) subframes available for Rel-12 UEs configured to flexible UL/DL mode.

FIG. 4 illustrates legacy subframes and NCT subframes as interpreted by legacy UEs and Release 12 UEs, according to certain embodiments.

FIG. 5 illustrates a comparison of legacy mode and flexible TDD mode in a radio frame configurations in a variety of different options, according to certain embodiments.

DETAILED DESCRIPTION

Figure 6:
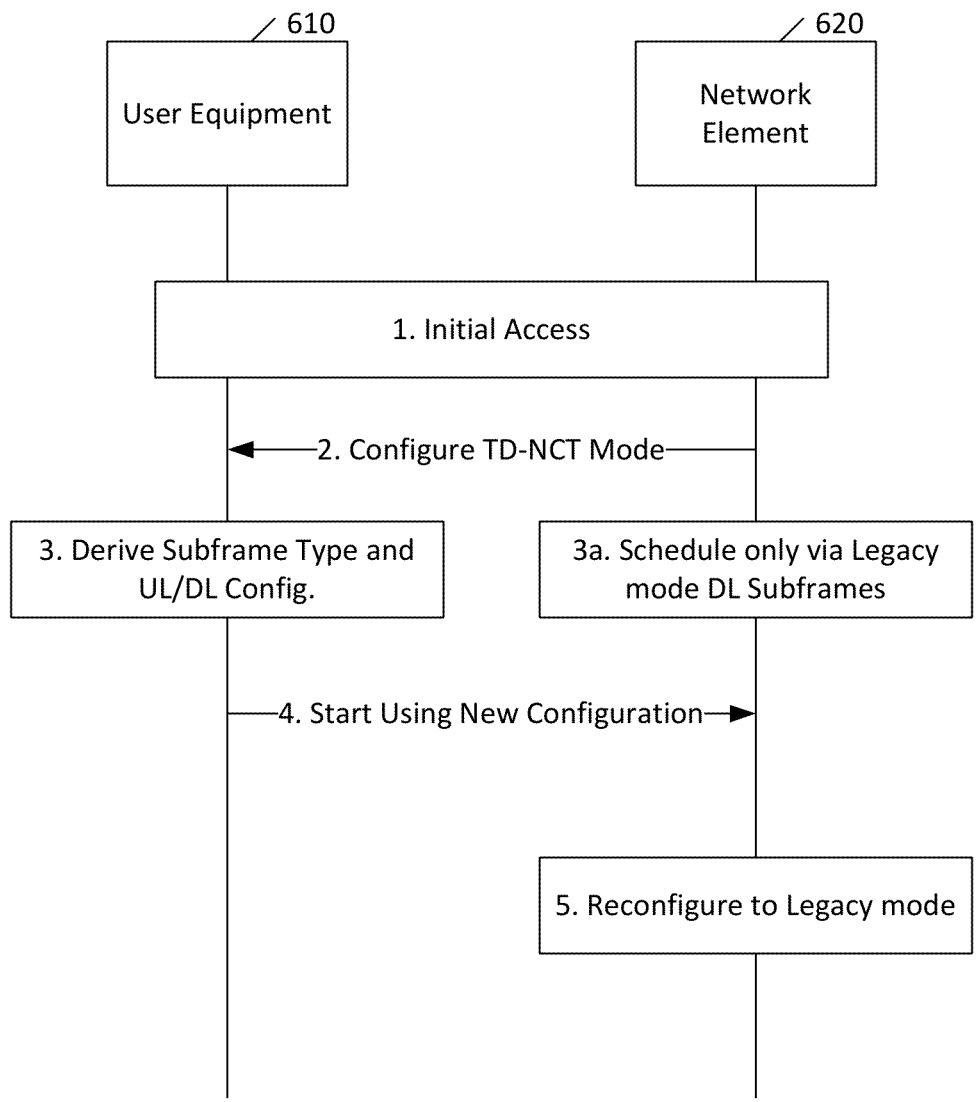
FIG. 6 illustrates signaling of a method according to certain embodiments.

Certain embodiments provide a backwards compatible new carrier type (NCT) realization for time division long term evolution (TD-LTE) based on a framework associated with enhanced interference management and traffic adaptation (eIMTA). Certain embodiments may relate to a specific mode available for eIMTA-capable user equipment (UEs) from Rel-12 onwards. This mode can be referred to as "TD-NCT mode," without limitation but for convenience of reference.

TD-NCT mode can be applied during predefined NCT subframes. In one embodiment, an evolved Node B (eNB) can configure one or more uplink (UL) subframes as NCT subframes. The UL subframes can be defined by uplink-downlink (UL-DL) configuration signaled via system information block #1 (SIB-1).

In another embodiment, NCT subframes can be defined to be the same as Flexible eIMTA subframes. However, when using TD-NCT mode, special subframes may not be used as NCT subframes. Instead, a special subframe may be used as S or D when using TD-NCT mode as will be discussed below.

Legacy mode can be applied during other-than-NCT subframes. Hybrid automatic repeat request (HARQ) feedback related to physical downlink shared channel (PDSCH) transmitted during NCT subframes can also be conveyed via other-than-NCT subframes.

UEs configured to use TD-NCT mode may follow separate HARQ/scheduling timing as compared to legacy UEs, which may follow the HARQ/scheduling timing defined by SIB-1 configuration. HARQ timing for TD-NCT mode can be derived more than one way. For example, HARQ timing for TD-NCT mode can be based on actual UL/DL split according to existing Rel-11 UL/DL configurations. Alternatively, HARQ timing for TD-NCT mode can be based on a so-called reference configuration principle, for example having separate configurations defined for UL-related and DL-related signaling.

FIG. 4 illustrates legacy subframes and NCT subframes as interpreted by legacy UEs and Release 12 UEs, according to certain embodiments. As shown in FIG. 4, NCT subframes can be seen as UL subframes from legacy UEs' point of view. Thus, UL usage of NCT DL subframes can be completely prevented by a specific eNB scheduler implementation and/or proper selection of NCT subframes. Proper selection of NCT subframes may for example allow to keep NCT subframes free from PUSCH re-transmissions.

As also shown in FIG. 4, NCT subframes can be seen as NCT DL subframes from Rel-12 UEs' point of view. The NCT DL subframes can have the following characteristics. There may be no uncertainty related to the NCT subframe link direction at the UE side. This may enable optimization of NCT subframes for DL-only usage in terms of channel state information (CSI) measurement and reporting by using, for example, similar CSI measurement and reporting mechanisms as discussed for secondary cell (Scell) NCT.

Certain embodiments, more particularly, can relate to determining that at least some of the SIB-1 configured UL subframes are used as NCT (DL) subframes whereas at least some other SIB-1 configured subframes are kept as regular DL/S/UL subframes. For example, the first configuration of the resource may be kept unchanged or a new configuration or reconfiguration may be used, depending on the current situation. Additionally, certain embodiments can include applying HARQ/scheduling timing based on determined subframe split between regular DL/S/UL and NCT subframes.

The determining can be done based on broadcast or dedicated signalling Moreover, the NCT subframe can be characterized as having no CRS, PSS/SSS, PDCCH, PHICH, PCFICH, physical broadcast channel (PBCH), or the like, transmitted. The transmission mode applied in NCT and regular DL subframes can be different. Further, demodulation reference signal can be used instead of common reference signal in NCT operation as reference for channel estimation (for example, phase and amplitude) for received signals. DM-RS differs from CRS several ways. DM-RS is transmitted only on PRBs currently allocated for PDSCH, EPDCCH, or some other channel. In other words, it is not transmitted on empty PRBs as CRS is. Further, DM-RS can be precoded with antenna weights that may be selected based on available channel state information for UEs receiving the signals contained in PDSCH or EPDCCH. Hence, and contrary to CRS, DM-RS precoding may change between both PRBs and subframes. The applied precoding can remain transparent to UE, as the same precoding is applied both for DM-RS as well as for PDSCH and EPDCCH. This is contrary to CRS, in which case UE needs to know the used eNB antenna ports as well as precoding possibly applied on PUSCH to successfully utilize CRS based channel estimation in PUSCH detection. Furthermore, UL usage (including legacy UE UL usage) of NCT DL subframes can be completely prevented by a specific eNB scheduler implementation and/or proper selection of NCT subframes. The operations of determining and applying can relate to a specific operation mode available for certain UE types, such as Rel-12 UEs.

HARQ/scheduling timing for UEs configured to the specific operation mode can be based on actual UL/DL split w.r.t existing Rel-11 UL/DL configurations or, as mentioned above, it can be based on a so-called reference configuration principle, such as having separate configurations defined for UL-related and DL-related signaling.

Even more generally, certain embodiments can provide for avoiding unutilized NCT potential for TD-LTE-specific optimization. Thus, certain embodiments provide ways to maintain backwards compatibility. Certain embodiments provide for ways to configure NCT for TD-LTE. Furthermore, certain embodiments provides ways to arrange HARQ/signaling timing. Thus, certain embodiments may reach NCT benefits on top of existing TD-LTE carrier benefits.

FIG. 5 illustrates a comparison of legacy mode and flexible TDD mode to a radio frame configurations in a variety of different options, according to certain embodiments. As shown in FIG. 5, radio frame structures applicable to TD-NCT mode can be compared with legacy mode, assuming SIB-1, as well as flexible TDD mode. NCT subframes are depicted as N in the figure. Four slightly different options have been identified as examples, while other options are also permitted. Option #1 can be a baseline scheme for the TD-NCT mode. In this option, NCT subframes can be defined to be the same as Flexible eIMTA subframes. Moreover, in this option a special subframe may not be considered as a flexible subframe.

In option #2, a special subframe can be considered as a DL subframe for UEs configured to use TD-NCT mode. This can provide at least two extra orthogonal frequency division multiple access (OFDMA) symbols for subframe #6, when compared to the first option. The exact number may depend on the special subframe configuration.

In option #3, a predefined number of flexible, for example eIMTA, subframes succeeding fixed UL subframe can be considered as UL subframe(s). This option may permit a balance between UL and DL capacity when TD-NCT mode is applied.

In option #4, a predefined number of flexible, for example eIMTA, subframes succeeding fixed UL subframe can be considered as flexible subframes. For example, the eNB scheduler may dynamically use these subframes as U or D, but not as N.

In certain embodiments, a Rel-12 UE configured to TD-NCT mode can have two transmission modes (TM) configured for DL subframes. A first transmission mode can be for NCT subframes. In this mode, CRS, PDCCH, physical HARQ indicator channel (PHICH), physical control format indicator channel (PCFICH), PSS/SSS and physical broadcast channel (PBCH) may not be transmitted at all. DM-RS based TM, similar to TM10, can be applied. For example, DM-RS can be used for data demodulation. Scheduling and HARQ feedback timing can follow either a predefined UL-DL configuration or eIMTA reference configuration approach, as discussed below. CSI measurement and reporting can follow mechanisms presented for secondary cell (Scell) NCT.

EPDCCH can be used for conveying DL control information. There can be separate EPDCCH configuration for NCT subframes and other DL subframes. Depending on the embodiment, EPDCCH may only contain DL assignments. UL subframes can be scheduled as in legacy mode, according to UL reference configuration timing. Alternatively, EPDCCH may also contain both DL assignments and UL grants. EPDCCH may have common search space similar to PDCCHs. Moreover, EPHICH may be present, at least in some scenarios, depending on the HARQ/scheduling timing defined for NCT subframes.

A second transmission mode can apply to legacy DL or special subframes. In this mode, CRS can be transmitted. Moreover, CRS or DM-RS based TM can be applied. Likewise, PDCCH/PHICH/PCFICH can be transmitted. EPDCCH may be transmitted in addition to PDCCH (according to Rel-11 rules).

HARQ and scheduling timing can be performed in a variety of ways. For example, it is possible to define HARQ and scheduling timing for TD-NCT mode based on actual UL/DL split w.r.t current Rel-11 UL/DL configurations. In options #1-2, the system could apply HARQ/scheduling timing specified for UL-DL configuration 5, whereas in option #3, the system could apply HARQ/scheduling timing specified for UL-DL configuration #4, and so on.

Various options can involve usage of EPHICH for at least some NCT subframes. Another approach is to define HARQ and scheduling timing for UEs configured to TD-NCT mode according to a so-called reference configuration principle, for example, determining separate reference configuration for UL and DL. This approach could be applied, for example, in the case of option #4.

The UL reference configuration can define PUSCH-to-(E)PHICH timing, DCI/(E)PHICH-to-PUSCH timing, and the number of HARQ processes for UL. Likewise, the DL reference UL/DL configuration can define PDSCH-to-ACK timing, the maximum number of HARQ processes for DL side, and HARQ-ACK signalling in UL, for example, a size of the HARQ-ACK codebook, i.e. number of HARQ-ACK bits to feedback.

The DL reference configuration cam be defined in such a way that NCT subframes are kept free from PUCCH/PUSCH (in case of legacy UEs, eNB scheduling restrictions are used to keep NCT subframes free from UL, as said). DL reference configuration determines the UL subframes for UEs configured to TD-NCT mode.

In certain embodiments, UL reference configuration can be defined more liberally than in eIMTA, such as in the case EPHICH is applied. Thus, NCT subframes can also contain HARQ feedback and scheduling information for UL subframes for UEs configured to TD-NCT mode. The scheduling overhead may be larger in macro cells, where TD-NCT mode can be used, than in small cells, which may be a target for eIMTA. Hence it may be beneficial for TD-NCT mode if signaling for UL scheduling is not focused on only a few subframes but can be spread over a larger number of subframes. This "NCT" UL reference configuration may be different from UL reference configuration signaled in SIB 1 and used by legacy terminals and terminals entering cell. In certain embodiments, DL reference configuration can also be used NCT UL reference configuration. In other words, UL/DL configuration in SIB 1 can determine both UL/DL configuration for UEs in legacy mode and also legacy DL subframes for TD-NCT mode UEs.

For remaining subframes, other than legacy DL subframes, DL reference configuration can determine subframe type: NCT DL subframe, special subframe, or UL subframe.

There may be further difference from flexible TDD. For example, in TD-NCT mode, CSI measurement and reporting can be different as compared to that of flexible UL/DL mode and can more closely resemble, for example, NCT Scell measurements. In NCT DL subframes, UE may be configured to measure own cell channel from CSI-RS resources and use DL IMR for inter-cell interference measurements without special modifications on measurements or measurement resources used to take potential own cell UL interference into account.

These differ from UE behavior discussed for eIMTA flexible subframes, as UE does not need to be prepared for cross-link UL interference on NCT DL subframes. Nevertheless, UE may be configured to transmit separate CSI reports for legacy and NCT DL subframes.

There is neither need for conveying the actual TDD configuration nor implicitly determining the link direction for the flexible subframes in TD-NCT mode, which may be the case in flexible TDD mode. Thus, TD-NCT mode can be free from additional signaling overhead as well as related error cases present in flexible TDD mode.

Further, eIMTA WI may or may not have particular DL PC solutions on flexible subframes to handle cross-link interference between cells in flexible subframes. For example, such DL PC enhancements may not be applied on NCT DL subframes due to absence of cross-link interference problem.

Certain embodiments may be standard related, while other embodiments may also be considered implementation related. In that case, UEs in macro cell are configured to flexible UL/DL mode with suitable configuration parameters, for example for EPDCCH and CSI-RS but eNB simply does not apply any UL/DL reconfigurations.

Signaling details can vary from embodiment to embodiment. FIG. 6, however, illustrates signaling of a method according to certain embodiments. As shown in FIG. 6, the signaling may occur between a user equipment 610 and a network element 620, which may be a device such as, for example, an access point or eNB.

At 1, initial access can follow legacy mode and UL-DL configuration defined by SIB-1. Then, at 2, an eNB, for example network element 620, can utilize dedicated higher layer signaling to configure TD-NCT mode for Rel-12 UEs, including UE 610, supporting the feature.

The higher layer signaling contains configuration of EPDCCH; CSI measurement resource (CSI-RS and IMR configuration) and CSI reporting parameters for NCT DL subframes; transmission mode parameters for NCT DL subframes; as well as UL-DL configuration or DL reference configuration applied in TD-NCT mode. Depending on the embodiment, the configuration may include also configuration for EPHICH for NCT DL subframes. Signalling may also contain explicit indicator for UL and Flexible subframes and/or NCT subframes (Option#3, Option#4).

Based on higher layer signaling, at 3 the UE 610 can derive the subframe type: Legacy mode DL subframe, NCT DL subframe, special subframe, or UL subframe. Moreover, based on the higher layer signaling, the UE 610 can also derive UL-DL configuration or DL reference configurations applied for HARQ/scheduling timing. Depending on embodiment (i.e. whether UL scheduling is supported via NCT DL subframes), UE may set UL reference configuration to be either the DL reference configuration or the UL/DL configuration defined by SIB-1.

The UE 610 may utilize the subframe type information when defining the PDCCH/EPDDCH blind decodings, EPHICH detection, control signaling codebook size, DL transmission mode, timing for scheduling and HARQ feedback, and possible micro sleep, for example to minimize UE power consumption.

At 4, the UE 610 configured to TD-NCT mode can start using the new configuration at the time the new configuration becomes valid at the UE side. During a time of uncertainty at 3a, the eNB 620 may schedule only via legacy mode DL subframes. Also at 4, the UE 610 can start using HARQ/scheduling timing defined by new UL-DL configuration or UL and DL reference configurations. Moreover, at 4, the UE may start to determine subframe type based on DL reference configuration and SIB-1 defined UL/DL configurations. The UE 610 can determine DL transmission mode as well as CSI measurement resources and reporting based on subframe type.

At 5, the eNB 620 may reconfigure legacy DL mode for the UE 610 at some point. This time may happen when there is no need for TD-NCT mode any more.

Figure 7:
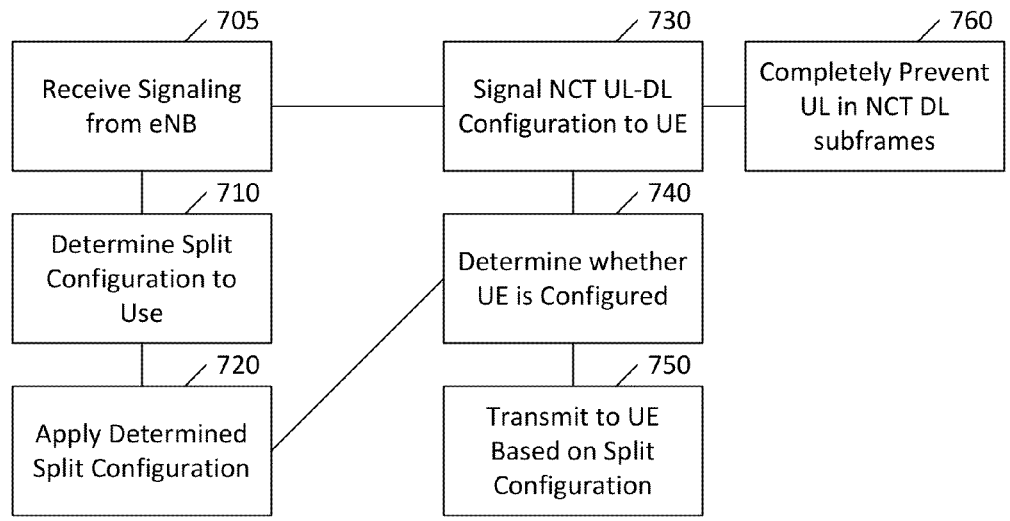
FIG. 7 illustrates a method according to certain embodiments.

FIG. 7 illustrates a method according to certain embodiments. As shown in FIG. 7, a method may include, at 710, a user equipment determining that a split configuration is to be followed, in which at least one system information block configured uplink subframe is configured as a new carrier type downlink subframe, whereas at least one other system information block configured subframe is kept as indicated by system information block configuration. The determining can be based on broadcast or dedicated signaling, received at 705.

The new carrier type subframe can lack common reference signal, primary synchronization signal, secondary synchronization signal, and physical broadcast channel, and the like. The hybrid automatic repeat request or scheduling timing can be based on at least one of an actual split between uplink and downlink with respect to an uplink-downlink configuration indicated by the uplink-downlink configuration associated with the system information block configuration or a reference configuration principle.

The method may also include, at 720, applying the determined split configuration to communications with an access point. The applying the determined split can include applying at least one of hybrid automatic repeat request or scheduling timing based on the determined subframe split. A transmission mode applied in the new carrier type subframe can be different from a transmission mode indicated by the system information block configuration.

The method can also include the access point at 730, signaling to the user equipment that a split configuration is to be followed, in which at least one system information block configured uplink subframe is configured as a new carrier type downlink subframe, whereas at least one other system information block configured subframe is kept as indicated by system information block configuration. For example, the signaling at 730 can include both signaling an indication of what the split configuration is and a signaling a command for the user equipment to use the split configuration. Alternatively, the split configuration itself can be signaled at one time and the instruction to use the split configuration can be signaled at another time. Moreover, optionally if a split configuration is used once, the split configuration may be taken into use again at some other time without a new reconfiguration of the full details of the split configuration but only by signaling a reversion to the split configuration.

The signaling can be directed to instruct the user equipment only when the user equipment is configured to use new carrier type. The signaling can include broadcast or dedicated signaling. Other kinds of signaling, such as multicast signaling, is also permitted. The signaling can be configured to instruct the user equipment to follow a first hybrid automatic repeat request or scheduling timing based on the subframe split, wherein the first hybrid automatic repeat request or scheduling timing is different from a second hybrid automatic repeat request or scheduling timing as indicated by the system information block configuration.

The method can also include, at 740, determining whether the user equipment is configured to follow the split configuration. As illustrated in FIG. 6, a transitional operation in which a legacy mode is used can be implemented before the determination is made.

As shown in FIG. 7, the method can further include, at 750, transmitting to the user equipment following the split configuration based on the determining. The method can include, at 760, completely preventing uplink usage of new carrier type downlink subframes by at least one of a specific scheduler implementation. Other approaches for preventing uplink usage of new carrier type downlink subframes are also permitted.

Other steps can also be performed, such as reconfiguring the UE for legacy UL/DL operation, as shown in FIG. 6. Likewise, other operations discussed herein may be performed together with the illustrated steps.

Figure 8:
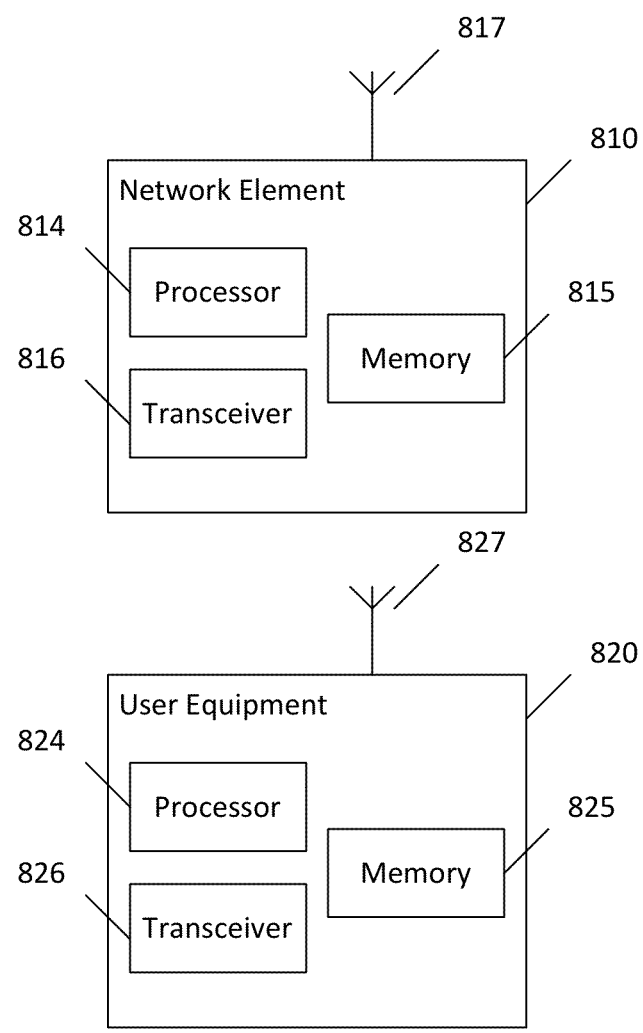
FIG. 8 illustrates a system according to certain embodiments.

FIG. 8 illustrates a system according to certain embodiments of the invention. It should be understood that each block of the flowchart of FIG. 7 and any combination thereof may be implemented by various means or their combinations, such as hardware, software, firmware, one or more processors and/or circuitry. In one embodiment, a system may comprise several devices, such as, for example, network element 810 and user equipment (UE) or user device 820. The system may comprise more than one UE 820 and more than one network element 810, although only one of each is shown in FIG. 8 for the purposes of illustration. A network element can be an access point, a base station, an eNode B (eNB), a server or any of the network elements discussed herein. Each of these devices may include at least one processor or control unit or module, respectively indicated as 814 and 824. At least one memory may be provided in each device, and indicated as 815 and 825, respectively. The memory may include computer program instructions or computer code contained therein. One or more transceiver 816 and 826 may be provided, and each device may also include an antenna, respectively illustrated as 817 and 827. Although only one antenna each is shown, many antennas and multiple antenna elements may be provided to each of the devices. Other configurations of these devices may be provided. For example, network element 810 and UE 820 may be additionally configured for wired communication, in addition to wireless communication, and in such a case antennas 817 and 827 may illustrate any form of communication hardware, without being limited to merely an antenna. Likewise, some network elements 810 may be solely configured for wired communication, and such cases antenna 817 may illustrate any form of wired communication hardware, such as a network interface card.

Transceivers 816 and 826 may each, independently, be a transmitter, a receiver, or both a transmitter and a receiver, or a unit or device that may be configured both for transmission and reception. The transmitter and/or receiver may also be implemented as a remote radio head which is not located in the device itself, but in a mast, for example. It should also be appreciated that according to a liquid or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is configured as software that can run on a server.

A user device or user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

Processors 814 and 824 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set, for example, procedures, functions, and the like. Memories 815 and 825 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity may be internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 810 and/or UE 820, to perform any of the processes described above (see, for example, FIGS. 6 and 7). Therefore, in certain embodiments, a computer-readable medium (for example, a signal or a non-transitory computer-readable medium) may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, or the like, or a low-level programming language, such as a machine language, or assembler. Another option is that the computer program or computer program code is loadable into the device or a memory the device has access to. Alternatively, certain embodiments of the invention may be performed entirely in hardware. Yet another option is that apparatus, such as a network element, is implemented at least partially by undedicated and programmable hardware which uses programmable resources.

It should be appreciated that embodiments may also be carried out at least partially by using cloud services or other software resources which do not necessarily locate in the device itself, but are otherwise available, such as transmittable from a server or host. In certain embodiments, many of the functions may be performed in distributed locations using a virtualization approach to computing.

Furthermore, although FIG. 8 illustrates a system including a network element 810 and a UE 820, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may have various benefits or advantages. For example, certain embodiments may provide for backwards compatibility in connection with new carrier type (NCT), while achieving the benefits associated with NCT as such. Moreover, certain embodiments may help time division duplex (TDD) to compete with frequency division duplex (FDD) as an alternative. For example, NCT for TD-LTE does not need to suffer from compromises made for flexible UL/DL ratio. Moreover, it may not make sense to use flexible TDD in all scenarios, for example in a macro scenario. Certain embodiments may provide a better use of resources for such scenarios.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

GLOSSARY

3GPP Third Generation Partnership Program
ACK Acknowledgement
CRS Common (Cell-specific) Reference Signal
CSI Channel State Information
CSI-RS Channel State Information Reference Signal
DCI Downlink Control Information
DL, D Downlink
DM RS Demodulation Reference Signal
EPDCCH Enhanced Physical Downlink Control Channel
EPHICH Enhanced Physical HARQ Indicator Channel
eIMTA Enhanced Interference Management and Traffic Adaptation
eNB eNode B (Base Station)
F Flexible
FDD Frequency Division Duplexing
HARQ Hybrid Automatic Repeat Request
HetNet Heterogenous Network
LTE Long Term Evolution
LTE-A Long Term Evolution Advanced
NCT New Carrier Type
OFDMA Orthogonal Frequency Division Multiple Access
PBCH Physical Broadcast Channel
PCFICH Physical Control Format Indicator Channel
PDCCH Physical Downlink Control Channel
PDSCH Physical Downlink Shared Channel
PHICH Physical HARQ Indicator Channel
PSS Primary Synchronization Signal
PUCCH Physical Uplink Control Channel
PUSCH Physical Uplink Shared Channel
RAN Radio Access Network
Rel Release
RLM Radio Link Monitoring
RRM Radio Resource Management
S Special
Scell Secondary cell
SIB-1 System Information Block #1
SSS Secondary Synchronization Signal
TDD Time Division Duplexing
TD-LTE Time Division (TDD) LTE
TM Transmission Mode
UE User Equipment
UL, U Uplink
UpPTS Uplink Pilot Time Slot

We claim:

1. A method, comprising:
    determining that a split configuration is to be followed, in which at least one system information block configured uplink subframe is reconfigured as a new carrier type downlink subframe, whereas at least one other system information block configured subframe is as indicated by system information block configuration; and
    applying the determined split configuration to communications with an access point,
    wherein hybrid automatic repeat request and scheduling timing applied for split configuration is based on at least one of timing based on existing configurations derived from an actual split between configured uplink and downlink subframes or a timing based on reference configuration principle.

2. The method of claim 1, wherein the applying the determined split configuration comprises applying at least one of hybrid automatic repeat request or scheduling timing based on the determined subframe split.

3. The method of claim 1, wherein the determining the split configuration is based on broadcast or dedicated signaling.

4. The method of claim 1, wherein demodulation reference signal is used as a channel estimation reference for signals received via the new carrier type downlink sub frame.

5. The method of claim 1, wherein a transmission mode applied in the new carrier type downlink subframe is configured independently from a transmission mode indicated by the system information block configuration.

6. A method, comprising:
    configuring a user device to follow a split configuration, in which at least one system information block configured uplink subframe is reconfigured as a new carrier type downlink subframe, whereas at least one other system information block configured subframe is as indicated by system information block configuration; and signaling the user device the split configuration, wherein the signaling is configured to instruct the user device to follow a first hybrid automatic repeat request or scheduling timing based on the split configuration, wherein the first hybrid automatic repeat request or scheduling timing is configured independently from a second hybrid automatic repeat request or scheduling timing as indicated by the system information block configuration.

7. The method of claim 6, further comprising:

completely preventing uplink usage of new carrier type downlink subframes by at least one of a specific scheduler implementation.

8. The method of claim 6, wherein the signaling is directed to instruct the user device only when the user device is configured to use new carrier type.

9. The method of claim 6, wherein the signaling comprises broadcast or dedicated signaling.

10. The method of claim 6, wherein at least one user device in a cell operates according to an uplink-downlink configuration defined by system information block and at least one other user device operates according to the split configuration.

11. The method of claim 6, further comprising:

signaling to the user device that the split configuration is to be followed.

12. An apparatus, comprising:

at least one processor; and at least one memory including computer program code, wherein the at least one memory and the computer program code are configured to, with the at least one processor, cause the apparatus at least to determine that a split configuration is to be followed, in which at least one system information block configured uplink subframe is reconfigured as a new carrier type downlink subframe, whereas at least one other system information block configured subframe is as indicated by system information block configuration; and apply the determined split configuration to communications with an access point, wherein hybrid automatic repeat request and scheduling timing applied for split configuration is based on at least one of timing based on existing configurations derived from an actual split between configured uplink and downlink subframes or a timing based on reference configuration principle.

13. The apparatus of claim 12, wherein the at least one memory and the computer program code are configured to, with the at least one processor, cause the apparatus at least to apply the determined split by applying at least one of hybrid automatic repeat request or scheduling timing based on the determined split configuration.

14. The apparatus of claim 12, wherein the at least one memory and the computer program code are configured to, with the at least one processor, cause the apparatus at least to determine the split configuration based on broadcast or dedicated signaling.

15. The apparatus of claim 12, wherein demodulation reference signal is used as a channel estimation reference for signals received via the new carrier type downlink subframe.

16. The apparatus of claim 12, wherein a transmission mode applied in the new carrier type downlink subframe is configured independently from a transmission mode indicated by the system information block configuration.

17. An apparatus, comprising:

at least one processor; and at least one memory including computer program code, wherein the at least one memory and the computer program code are configured to, with the at least one processor, cause the apparatus at least to configure a user device to follow a split configuration, in which at least one system information block configured uplink subframe is reconfigured as a new carrier type downlink subframe, whereas at least one other system information block configured subframe is as indicated by system information block configuration; and signal the user device the split configuration, wherein the at least one memory and the computer program code are configured to, with the at least one processor, cause the apparatus at least to instruct the user device to follow a first hybrid automatic repeat request or scheduling timing based on the subframe split, wherein the first hybrid automatic repeat request or scheduling timing is configured independently from a second hybrid automatic repeat request or scheduling timing as indicated by the system information block configuration.

18. The apparatus of claim 17, wherein the at least one memory and the computer program code are configured to, with the at least one processor, cause the apparatus at least to completely prevent uplink usage of new carrier type downlink subframes by at least one of a specific scheduler implementation.

19. The apparatus of claim 17, wherein the at least one memory and the computer program code are configured to, with the at least one processor, cause the apparatus at least to instruct the user device regarding the split configuration only when the user device is configured to use new carrier type.

20. The apparatus of claim 17, wherein the at least one memory and the computer program code are configured to, with the at least one processor, cause the apparatus at least to signal the split configuration by broadcast or dedicated signaling.

21. The apparatus of claim 17, wherein at least one user device in a cell is configured to operate according to an uplink-downlink configuration defined by system information block and at least one other user device is configured to operate according to the split configuration.

22. The apparatus of claim 17, wherein the at least one memory and the computer program code are configured to, with the at least one processor, cause the apparatus at least to signal to the user device that the split configuration is to be followed.

* * * * *